United States Patent [19]

Ivers

[11] Patent Number: 4,560,569

[45] Date of Patent: Dec. 24, 1985

[54] FORMULATION OF DOUGH-BASED FRIED SNACK FOODS

[75] Inventor: John T. Ivers, Lewisville, Tex.

[73] Assignee: Frito-Lay, Inc., Dallas, Tex.

[21] Appl. No.: 583,222

[22] Filed: Feb. 24, 1984

[51] Int. Cl.⁴ .............................................. A21D 2/32
[52] U.S. Cl. .................................. 426/549; 426/438; 426/550; 426/560; 426/653
[58] Field of Search ............... 426/321, 331, 549, 550, 426/560, 637, 653, 662, 438, 439, 441, 808

[56] References Cited

U.S. PATENT DOCUMENTS

| | | | |
|---|---|---|---|
| 3,297,450 | 1/1967 | Loska | 426/550 |
| 3,549,382 | 12/1970 | Hansen | 426/653 |
| 3,753,735 | 8/1973 | Gerkens | 426/550 X |
| 3,864,505 | 2/1975 | Hunter | 426/808 X |
| 3,997,684 | 12/1976 | Willard | 426/550 |
| 4,178,393 | 12/1979 | Gregersen | 426/653 |
| 4,221,842 | 9/1980 | Toft | 426/438 X |
| 4,238,517 | 12/1980 | Bosley et al. | 426/550 X |
| 4,455,321 | 6/1984 | Glabe et al. | 426/550 X |

FOREIGN PATENT DOCUMENTS 0096305 12/1983 European Pat. Off. ............ 426/550

*Primary Examiner*—Arthur L. Corbin
*Attorney, Agent, or Firm*—Bernard, Rothwell & Brown

[57] ABSTRACT

The addition of a small amount of a lecithin-in-water suspension to the formulation of dough-based fried snack foods improves dough transfer, sheeting and cutting, and significantly reduces clumping during frying, without the rapid buildup of free fatty acids, and without significant darkening of frying oil normally associated with the frying of foods containing lecithin.

9 Claims, 1 Drawing Figure

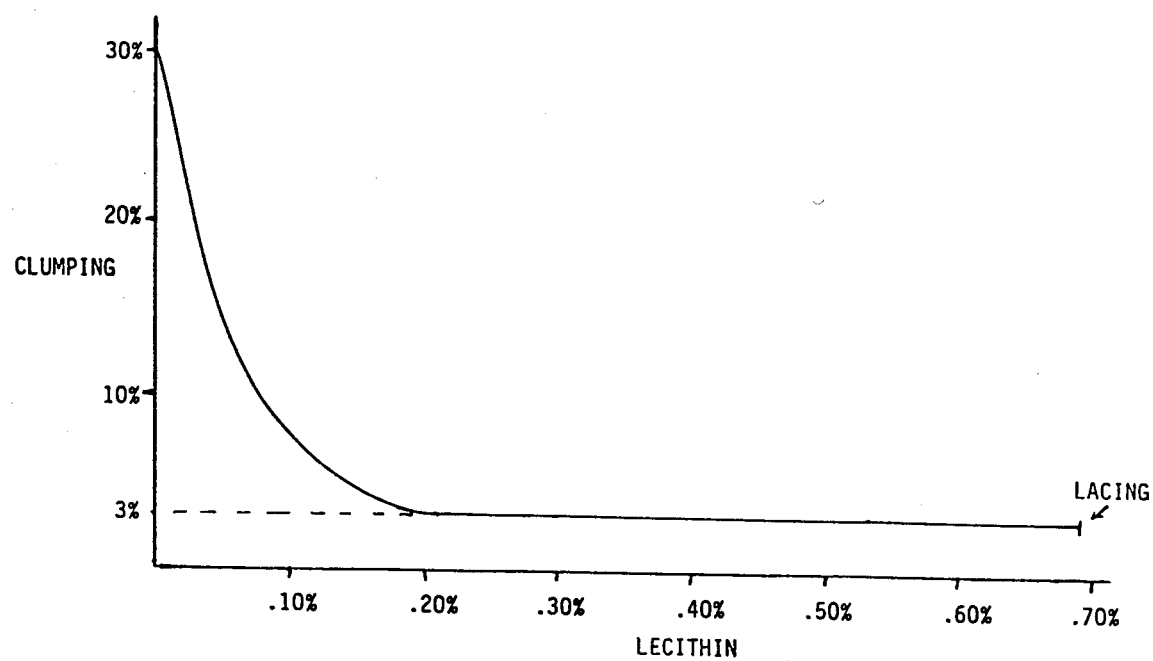

FORMULATION OF DOUGH-BASED FRIED SNACK FOODS

BACKGROUND OF THE INVENTION

1. Field of the Invention

This invention relates to an improvement in the formulation of dough-based fried snack foods, especially products made from potato flakes.

2. Background Art

Food preservation is a long practiced art, made necessary by the seasonal nature of most cultivated crops, the action of cellular enzymes, the ubiquity of mycobacteria, insects and rodents, and by the economic advantage obtained by shipping foodstuffs from fertile growing areas to locations of greatest demand. The preparation of peserved foods frequently entails certain steps necessary to return the food to its normal appearance and taste. For centuries, potatoes have been a staple in the diet of Europeans and Americans. Whole potatoes were stored in cool buildings and cellars, and cooked by boiling or baking. Chemical changes in the potato, specifically the conversion of starch to reducing sugars and the "greening" due to the formation of chloroplasts, had little effect on the nutritive value or final appearance of the meal. Fried potato foods, such as french fries, shoestring potatoes, and especially potatoe chips, however, are discolored when reducing sugars are present. In the case of potato chips, only certain varieties of potato can be used to make a commercially acceptable chip, and numerous processes have been developed to store and prepare potatoes for slicing.

In recent years, much of the potato crop in the Western United States has been converted to potato flakes or flour. The removal of the water (as much as 80% of the weight of some varieties) makes storage and shipping more convenient and economical. Reconstitution with water produces an acceptable mashed potato, but the formulation of shaped potato products, such as fries or chips, requires the addition of a binder to form a dough, and the implementation of one or more novel process steps. U.S. Pat. Nos. 3,297,450, 3,539,356, 3,687,679, 3,753,735, 3,800,050, 3,935,322, 3,997,684, 3,998,975, 4,005,139, 4,082,855, 4,140,803, 4,221,842, and 4,238,517 are illustrative of various approaches which have been used in forming a fry or chip from a dough. An extrusion or sheeting step is normally required to achieve the required shape and thickness of a fry or chip. The dough must be formulated to be easily spread to the desired thickness, to resist sticking to the belt or roller, to be cleanly cut by a die, and to resist clumping during frying. Frequently, the resultant product lacks the characteristic flavor and mouth feel of a good potato chip made by the traditional methods of slicing, washing, and frying the slice.

"Lecithin" is a generic name for a class of compounds which are mixed esters of glycerol and choline with fatty acids and phosphoric acid. Lecithin is present in eggs, but the predominant product in commerce today is prepared primarily from soybeans. Commercial soybean lecithin also contains cephalins (an analog of lecithin in which ethanolamine or serine is substituted for choline) as well as inositol, phosphatides, carbohydrates and traces of other substances. Lecithin is readily soluble in mineral oil but poorly soluble in vegetable oils. It is insoluble in water but forms an emulsion with water in certain concentrations. One use of soybean lecithin is as an emulsifying agent in oleomargarine and mayonnaise. Lecithin is also added in small amounts in doughs for baking, but is not used for doughs which are fried in deep fat or oil because the lecithin decomposes at high temperatures to produce free fatty acids among other products. Since many liquid lecithin preparations also include excess free fatty acids to solubilize the lecithin for easier handling (*Kirk-Othmer Encyclopedia of the Chemical Industries*, Vol. 12, p. 351, 1967 Edition), the use of lecithin in fried foods has historically been avoided, since it causes a buildup of free fatty acids and darkening of the cooking oil. Addition of powdered lecithin to food products that are fried during their production results in rapid free fatty acid increases as well as significant oil darkening rendering the oil unsuitable after only a few hours. Prior to this invention there were no known methods for preventing such deterioration. Products which contain free fatty acids turn rancid quickly and cannot be shipped and stored for an acceptable period of time. As a result, the superior emulsifying properties of lecithin routinely employed by bakers have been unavailable to producers of fried dough-based foods, and less effective chemicals such as mono-substituted glycerides have been substituted, with less satisfactory results.

SUMMARY OF THE INVENTION

The present invention provides a novel process for the preparation of a dough for the production of fried snack foods. The process involves the addition of a lecithin-in-water suspension containing lecithin in a range of about 0.20 to 0.70% to the dough containing pregelatinized starch, dry flaked or powdered cereal or flakes of a starchy vegetable, and water, vegetable oil and flavorings. The resultant dough is easily formed by sheeting, followed by die cutting and frying so as to resemble a chip prepared by traditional methods directly from the vegetable.

BRIEF DESCRIPTION OF THE DRAWING

The FIGURE is a graphic depiction of the effects on clumping during frying of a potato-based product containing various concentrations of lecithin.

DETAILED DESCRIPTION OF THE INVENTION

The dough for a dough-based fried food product typically consists of flour or flake of the chosen grain or vegetable and vegetable oil, water and flavorings. When a low starch flour or flake is employed, a processed starch in either gelatinized or ungelatinized form is frequently added. Water is required to soften the flour and, depending on the protein content of the flour, to form a network of protein (gluten) which is the framework of the product. Starch, which is present in flours, especially potato, corn and bean flour, is used as a binder and is required for the unleavened product to expand on frying. Starch also absorbs chemicals from the cooking oils which contribute to the flavor of the fried product. Oils may be added to the dough to control the stickiness of the dough and to control the hardness of the cooked product by controlling the extent of the protein framework.

Doughs used for the manufacture of fried chip-type products must be formed in thin, relatively homogeneous layers. This is normally accomplished in an automated process, by "sheeting", i.e., placing the dough on a smooth surface and rolling the dough to the desired final thickness. The dough is prepared by adjusting the ratios of components and the mixing time to allow it to sheet uniformly at the desired thickness, without sticking or tearing. Control of the dough thickness is particularly important in manufactured potato chips because the product is compared in texture and color to the product made from sliced potatoes. Emulsifying agents are used to achieve a uniform distribution of oil and water in the dough. Although fatty acid esters of glycerol have been used in some published formulations, it has been found that soybean lecithin is superior in achieving the desired dough plasticity in a non-sticky formulation. Direct addition of lecithin in dry form to the dough produces a satisfactory dough sheet and fried chip but causes a buildup of fatty acids in the vegetable-based frying oil and consequent darkening of the frying oil.

It has surprisingly been found that when lecithin is added to the dough during mixing, as a fairly concentrated lecithin suspension (1–5% w/v) in sufficient quantity to achieve the desired dough properties, free fatty acid buildup in the fryer is avoided. Additionally, the frying oil quality is maintained, i.e., severe oil darkening, rendering it unsuitable for further use in a few hours, does not occur. Furthermore, clumping of the product during frying, as high as 30% when using formulations not containing lecithin, is remarkably reduced when lecithin emulsion is included in the mix.

The emulsion is formed by stirring dried lecithin powder free of excess fatty acids into water, such that when the emulsion is added to the remaining ingredients of the mix, the concentration of lechithin based on the dry mix weight being at or above about 0.02% by weight, but below about 0.70% by weight. It has been found that lecithin at concentrations of less than about 0.02% by weight based on the dry mix weight does not significantly reduce clumping, and at concentrations at or above about 0.69% by weight, the dough sheet becomes lacy and unmanageable due to tearing and breaking. Preferably, the lecithin emulsion results in lecithin concentration of from about 0.20% to about 0.60% by weight relative to the dry mix weight, although lecithin concentrations at above about 0.25% by weight do not result in a further improvement in resistance to clumping. Most preferably, the concentration of lecithin relative to the dry mix weight is from about 0.20% to about 0.25% by weight. At a concentration in this range, clumping of the product during frying is reduced from about 30% to about 3% when compared to similar formulations without lecithin (see FIG. 1).

As one example of the benefits achieved by the present invention, when about 0.2% lecithin in water was used in the preparation of the dough, free fatty acid concentration in the frying oil reached a plateau after 10 hours and increased only very slightly thereafter during the normal useful life of the oil. This may vary with different fryers, production rates, etc. In contrast, when dry lecithin is used in the dough, the free fatty acid concentration increases linearly with time after the first hour and the oil is unusable after 6 hours due to darkening, and free fatty acid buildup occurs.

A particularly advantageous result of the practice of this invention is the energy-saving which results from the properties of the dough which contains as little as 0.05% lecithin. The dough exits evenly from a continuous mixer and sheets without sticking to the roller. Approximately ⅓ less energy is consumed in the sheeting process, as measured by motor amperage, than is required when no lecithin is present.

This invention has been described with particular emphasis upon the manufacture of potato chips, but is also applicable to the production of other dough-based snack foods. Examples, which are not intended to be limiting, include snack foods containing corn, beans, rice, and wheat and which may include any approved natural or synthetic flavoring. The following example illustrates the applicability and advantages of the present invention, without intending to be limiting thereof.

EXAMPLE 1

Raw materials (30% modified food starch, 2% sugar, 0.6% salt, 0.3% oil and 67% potato flakes) are first blended together in a ribbon blender. The resulting essentially dry mix is then transferred via vacuum to a large hopper. The dry mix is metered from this hopper into a Wenger mixer by use of an Acrison volumetric feeder. A 2.5% (w/v) lecithin/water suspension is introduced into the dry mix shortly past the mixer entrance. The remainder of the water necessary for proper dough formation is then added in the Wenger mixer slightly after the addition of the lecithin/water suspension. The resulting dough is sheeted on a two-roll sheeter, dried slightly by passage through a jet-sweep oven, and cut into rectangular pieces by a rotary cutter. After frying in vegetable oil, the chips are oil sprayed in a tumbler to increase oil content, cooled on a cooling conveyor, salted or seasoned and packaged.

The lecithin/water suspension is prepared by vigorously mixing 100 g. of powdered lecithin with 4,000 mls. of water in a large blender. This suspension is added at a rate that results in a concentration of 0.23% lecithion based on the dry mix weight.

It will be appreciated that modifications of the present invention, within the skill of those familiar with the cooking arts, can be undertaken without departure from the spirit or scope of this invention.

We claim:

1. In a process for the preparation of a comestible product which includes the steps of:
   (a) preparing a dough of pregelatinized starch, a dry flaked or powdered cereal or flakes of a starchy vegetable, vegetable oil, water, sugar and salt;
   (b) sheeting the dough;
   (c) cutting the sheeted dough to produce a shaped chip;
   (d) frying the shaped chip in fat or oil; and
   (e) seasoning the fried product,
     the improvements in the process comprising; forming a suspension of lecithin in water, the amount of lecithin being at least 0.02% of the weight of the pregelatinized starch and dry flaked or powdered cereal or flakes of starchy vegetable, and less than an amount in which the sheeted dough becomes lacy and breakage occurs, and adding the lecithin suspension to the dough prior to the sheeting of the dough.

2. A process as in claim 1 wherein the lecithin is added in a range of 0.2 to 0.25% of the dry weight of the dough ingredients.

3. The process of claim 2 in which the flakes of a starchy vegetable are potato flakes.

4. The process of claim 2 in which the dry flaked cereal is corn flakes.

5. The process of claim 2 in which the dry flaked cereal is wheat flakes.

6. A product made in accordance with the process of claim 1.

7. A process for producing a dough which, when fried, resembles a potato chip, comprising mixing potato flakes, pregelatinized starch, edible oil, water, seasoning, and a soybean lecithin suspension in water wherein the concentration of soybean lecithin is between about 0.2 and 0.7% of the dry weight of the dough ingredients.

8. A process for making a dough which is to be fried to produce a comestible snack food comprising preparing a suspension of vegetable-derived lecithin in water and adding the lecithin in water suspension to a dough containing pregelatinized starch, flaked potato particles, edible oil, water and seasoning in an amount such that the lecithin concentration in the dough is from about 0.2 to 0.7% of the dry weight of the dough ingredients.

9. A process for improving the flow characteristics and thickness of a mixed dough containing pregelatinized starch and cereal comprising adding a lecithin-in-water suspension to the dough ingredients during mixing of the dough, the amount of lecithin in the lecithin-in-water suspension being about 0.2 to 0.7% of the dry weight of the dough ingredients.

* * * * *